P. F. WILLIS.
OXYACETYLENE WELDING TORCH.
APPLICATION FILED JULY 23, 1914.
1,119,916.
Patented Dec. 8, 1914.
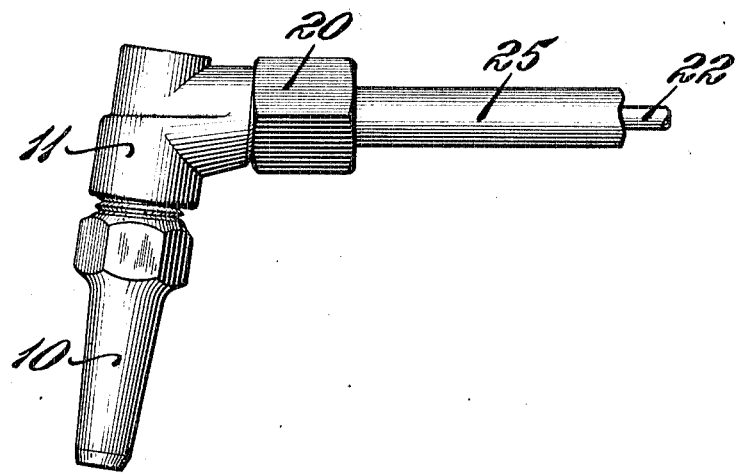
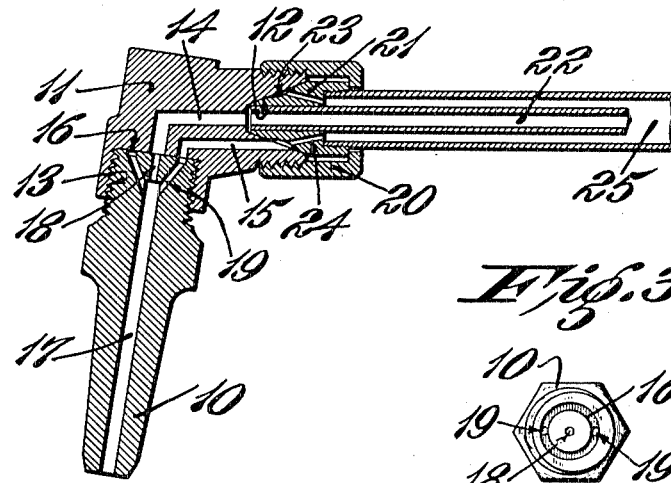
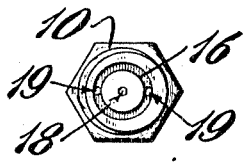
Witnesses:
Edgar S. Farmer
[signature]
Inventor:
Prior F. Willis
By [signature]
his Attys.

UNITED STATES PATENT OFFICE.

PRIOR F. WILLIS, OF ST. LOUIS, MISSOURI.

OXYACETYLENE WELDING-TORCH.

1,119,916.  Specification of Letters Patent.  Patented Dec. 8, 1914.

Application filed July 23, 1914. Serial No. 852,751.

*To all whom it may concern:*

Be it known that I, PRIOR F. WILLIS, a citizen of the United States, and a resident of the city of St. Louis and State of Missouri, have invented a new and useful Improvement in Oxyacetylene Welding-Torches, of which the following is a specification.

This invention relates to welding metals by means of a flame produced by the combustion of a mixture of oxygen and acetylene gases, and consists in a head and burner tip for a torch of the general type shown in my prior Patent No. 1,070,866, dated August 19, 1913.

The object of the invention is an improved head and burner tip adapted for use in a torch handle such as is shown in Patent No. 1,070,866, but the invention is not restricted to use in such a torch.

A further object of the invention is a head and burner tip which can be quickly put together and taken apart, which does not require careful adjustment, which cannot get out of adjustment, which will not soon become clogged or foul, and which can be readily cleaned.

Further objects of the invention appear in connection with the following description of the construction shown in the accompanying drawings, which illustrate a preferred form of the invention.

In the drawings, in which like reference characters designate the same parts in the several views, Figure 1 is a side view of the torch head and tip, showing a portion of the torch handle; Fig. 2 is a cross-section of the same on the principal axis of the device; and Fig. 3 is an end view of the inner end of the burner tip.

The torch handle and connections for the oxygen and acetylene are not fully shown in the drawings, and reference is had to my prior Patent No. 1,070,866 for the general arrangement of the parts. The torch head 11 is an L-shaped piece having a conical socket 12 in the end of one branch and a cylindrical socket 13 in the end of the other branch. An axial passage 14 for oxygen connects the centers of the sockets, and a side passage 15 for acetylene leads from a point in the conical side wall of the socket 12 to a point removed from the center of the flat bottom of the socket 13.

The burner tip 10 tapers slightly toward its tip or outer end, and is threaded exteriorly at its inner end. It screws into the cylindrical socket 13, and is faced off flat on its inner end to form a tight joint with the flat bottom or seat of the socket. An annular groove 16 is cut in the face of the inner end of the burner tip concentric with the axis of the tip, the diameter of the groove being such that the groove registers with the end of the acetylene passage 15 in the head. The groove 16 divides the flat inner end of the burner tip into two flat concentric bearing surfaces located in the same plane. An axial mixing chamber or passage 17 extends in from the outer end of the burner tip nearly to the flat inner face, and a smaller passage 18 in alinement with the chamber 17 connects with its inner end and passes through the inner end of the burner tip and comes out at the center of the flat face. Two inclined passages 19 connect the inner end of the chamber 17 with the annular groove 16, arranged symmetrically on opposite sides of the center of the inner end of the burner tip. These passages 18 and 19 are for oxygen and acetylene, respectively, and are made each the proper size to obtain the desired proportions of the two gases in the mixing chamber 17. It is contemplated that several burner tips having oxygen and acetylene passages of different sizes to suit different requirements shall form part of the equipment of each torch.

The branch of the head 11 having the conical socket 12 is threaded exteriorly, and a sleeve nut 20 for securing the handle is screwed on it. The handle has a conical end 21 which fits the socket 12, with an axial pipe 22 through it which communicates with the oxygen supply. Around the conical end 21 is a groove 23 which registers with the acetylene passage 15 when the parts are assembled. Small inclined passages 24 connect the groove 23 with the acetylene pipe 25, which surrounds the oxygen pipe 22, as is more fully shown in my prior Patent No. 1,070,866.

What I claim as my invention is as follows:

1. A torch having a head and a detachable one-piece tip, said head having a socket for said tip provided with a flat circular seat at its inner end, and gas passages through said head, one of said gas passages emerging at one side of the center of said seat, and said tip having a flat circular end face conforming to the seat in said socket and formed with a shallow annular groove adapted to register with said last named gas passage in said head, said groove dividing the end face of said tip into annular concentric surfaces in the same plane, said tip having a longitudinal bore of uniform diameter extending from its outer end nearly to its inner face and a plurality of short converging passages of less diameter than said bore connecting the inner end of said bore and the inner face of said tip, one of said short passages being inclined to said bore and connecting said annular groove and the side wall of said bore near its inner end.

2. A torch having a head and a detachable one-piece tip, said head having a socket for said tip provided with a seat at its inner end, and gas passages through said head, one of said gas passages emerging at one side of the center of said seat, and said tip having an end face conforming to the seat in said socket and formed with a shallow annular groove adapted to register with said last named gas passage in said head, said tip having a longitudinal bore of uniform diameter extending from its outer end nearly to its inner face and a plurality of short converging passages of less diameter than said bore connecting the inner end of said bore and the inner face of said tip, one of said short passages being inclined to said bore and connecting said annular groove and the side wall of said bore near its inner end.

3. An L-shaped head for a torch, said head having a socket for a tip at the extremity of one branch and a socket at the extremity of the other branch, a central gas passage connecting said sockets, a side gas passage connecting said sockets, and a tip in one of said sockets provided with a seat on its inner end having a central passage through it and an annular groove adapted to register with the side passage in said head, said central passage being enlarged at the outer end of the tip and said tip having a passage from said groove to the enlarged portion of said central passage.

Signed at St. Louis, Missouri, this 20th day of July, 1914.

PRIOR F. WILLIS.

Witnesses:
A. M. HOLCOMBE,
M. A. SHELTON.